(12) United States Patent
Ohmura et al.

(10) Patent No.: US 7,515,613 B2
(45) Date of Patent: Apr. 7, 2009

(54) DATA TRANSMISSION APPARATUS AND DATA TRANSMISSION METHOD

(75) Inventors: Norio Ohmura, Nara (JP); Toshiya Aoki, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 631 days.

(21) Appl. No.: 11/035,076

(22) Filed: Jan. 14, 2005

(65) Prior Publication Data
US 2005/0157657 A1    Jul. 21, 2005

(30) Foreign Application Priority Data
Jan. 20, 2004   (JP)   ............... 2004-011451

(51) Int. Cl.
*H04J 13/00*   (2006.01)
(52) U.S. Cl. .................... 370/479; 375/242
(58) Field of Classification Search ........... 370/282, 370/479, 245; 375/102, 103, 242, 246, 238, 375/239, 2; 713/600, 500
See application file for complete search history.

(56) References Cited

U.S. PATENT DOCUMENTS

| | | | | |
|---|---|---|---|---|
| 3,893,062 A | * | 7/1975 | Segui | ................... 367/134 |
| 4,119,803 A | * | 10/1978 | Jacob | ................... 370/250 |
| 4,550,403 A | * | 10/1985 | Beynie | ................... 370/479 |
| 4,910,750 A | * | 3/1990 | Fisher | ................... 375/292 |
| 5,070,516 A | * | 12/1991 | Le Comte | ................... 375/349 |
| 6,064,697 A | * | 5/2000 | Yoshikawa | ................... 375/242 |
| 6,763,477 B1 | * | 7/2004 | McGee | ................... 713/600 |
| 2002/0118769 A1 | * | 8/2002 | Karaoguz | ................... 375/265 |

FOREIGN PATENT DOCUMENTS

JP    60-012837 A    1/1985

* cited by examiner

*Primary Examiner*—Ricky Ngo
*Assistant Examiner*—David Oveissi
(74) *Attorney, Agent, or Firm*—Harness, Dickey & Pierce, PLC

(57) ABSTRACT

An input signal INDATA inputted to a sender-side interface portion is encoded by an encoder, and a transmission signal generated by the encoding is transmitted to a receiver-side interface portion through two signal transmission lines. The input signal INDATA is encoded in such a manner that the logic level of the transmission signal transmitted through at least one of the two signal transmission lines is changed in any two consecutive elementary periods. The receiver-side interface portion is provided with a clock receiver, and a clock signal is generated based on the change of the transmission signals supplied from the two signal transmission lines.

6 Claims, 10 Drawing Sheets

Fig.4

| DIN1 | DIN2 | DIN3 | INDATA |
|---|---|---|---|
| 0 | 0 | 0 | 000 |
| 0 | 0 | 1 | 001 |
| 0 | 1 | 0 | 010 |
| 0 | 1 | 1 | 011 |
| 1 | 0 | 0 | 100 |
| 1 | 0 | 1 | 101 |
| 1 | 1 | 0 | 110 |
| 1 | 1 | 1 | 111 |

Fig.5

| A LINE SIGNAL | B LINE SIGNAL | AB TRANSMISSION STATE |
|---|---|---|
| LOW LEVEL | LOW LEVEL | X |
| LOW LEVEL | HIGH LEVEL | Y |
| HIGH LEVEL | LOW LEVEL | Z |
| HIGH LEVEL | HIGH LEVEL | S |

Fig.7

| FIRST ELEMENTARY PERIOD | SECOND ELEMENTARY PERIOD |
|---|---|
| X | X |
| X | Y |
| X | Z |
| Y | X |
| Y | Y |
| Y | Z |
| Z | X |
| Z | Y |
| Z | Z |

Fig.8

| INDATA | FIRST ELEMENTARY PERIOD | SECOND ELEMENTARY PERIOD |
|---|---|---|
| 000 | X | X |
| 001 | X | Y |
| 010 | X | Z |
| 011 | Y | X |
| 100 | Y | Y |
| 101 | Y | Z |
| 110 | Z | X |
| 111 | Z | Y |

Fig.9

| INDATA | FIRST ELEMENTARY PERIOD | SECOND ELEMENTARY PERIOD |
|---|---|---|
| 000 | X | S |
| 001 | X | Y |
| 010 | X | Z |
| 011 | Y | X |
| 100 | Y | S |
| 101 | Y | Z |
| 110 | Z | X |
| 111 | Z | Y |
| FLAG | Z | S |

Fig.10A

| INPUT | | | OUTPUT | | | |
|---|---|---|---|---|---|---|
| | | | FIRST ELEMENTARY PERIOD | | SECOND ELEMENTARY PERIOD | |
| DIN1 | DIN2 | DIN3 | A LINE | B LINE | A LINE | B LINE |
| 0 | 0 | 0 | 0 | 0 | 1 | 1 |
| 0 | 0 | 1 | 0 | 0 | 0 | 0 |
| 0 | 1 | 0 | 0 | 0 | 1 | 0 |
| 0 | 1 | 1 | 0 | 1 | 1 | 1 |
| 1 | 0 | 0 | 0 | 1 | 1 | 0 |
| 1 | 0 | 1 | 1 | 0 | 0 | 0 |
| 1 | 1 | 0 | 1 | 0 | 0 | 1 |
| 1 | 1 | 1 | 1 | 0 | 1 | 1 |
| FLAG | | | | | | |

Fig.10B

| INPUT | | | | OUTPUT | | |
|---|---|---|---|---|---|---|
| FIRST ELEMENTARY PERIOD | | SECOND ELEMENTARY PERIOD | | | | |
| A LINE | B LINE | A LINE | B LINE | DOUT1 | DOUT2 | DOUT3 |
| 0 | 0 | 1 | 1 | 0 | 0 | 0 |
| 0 | 0 | 0 | 1 | 0 | 0 | 1 |
| 0 | 0 | 1 | 0 | 0 | 1 | 0 |
| 0 | 1 | 1 | 0 | 1 | 1 | 1 |
| 0 | 1 | 0 | 1 | 1 | 0 | 0 |
| 1 | 0 | 0 | 1 | 1 | 1 | 1 |
| 1 | 0 | 1 | 1 | 1 | 1 | 0 |
| 1 | 1 | 1 | 1 | 1 | 1 | 1 |
| FLAG | | | | | | |

Fig.11

| AB TRANSMISSION STATE | | SIGNAL WHOSE LOGIC LEVEL CHANGES WHEN TRANSITIONING FROM LEADING ELEMENTARY PERIOD TO TRAILING ELEMENTARY PERIOD |
|---|---|---|
| LEADING ELEMENTARY PERIOD | TRAILING ELEMENTARY PERIOD | |
| X | Y | B LINE SIGNAL |
| X | Z | A LINE SIGNAL |
| X | S | A LINE SIGNAL, B LINE SIGNAL |
| Y | X | B LINE SIGNAL |
| Y | Z | A LINE SIGNAL, B LINE SIGNAL |
| Y | S | A LINE SIGNAL |
| Z | X | A LINE SIGNAL |
| Z | Y | A LINE SIGNAL, B LINE SIGNAL |
| Z | S | B LINE SIGNAL |
| S | X | A LINE SIGNAL, B LINE SIGNAL |
| S | Y | A LINE SIGNAL |
| S | Z | B LINE SIGNAL |

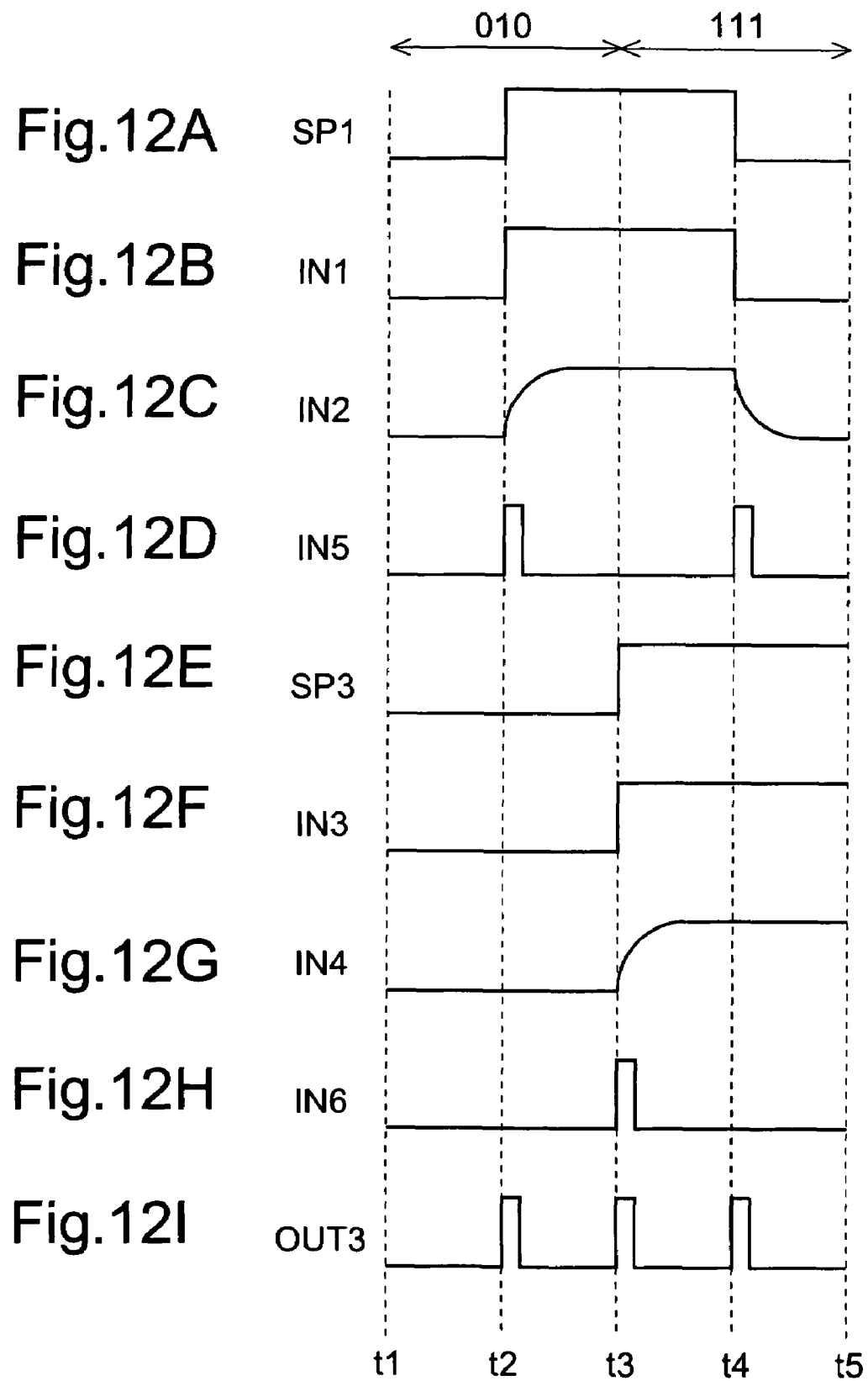

DATA TRANSMISSION APPARATUS AND DATA TRANSMISSION METHOD

CROSS REFERENCE TO RELATED APPLICATIONS

This application claims priority under 35 U.S.C. § 119(a) upon Japanese Patent Application No. 2004-011451 titled "DATA TRANSMISSION APPARATUS AND DATA TRANSMISSION METHOD," filed on Jan. 20, 2004, the entire content of which is hereby incorporated by reference.

BACKGROUND OF THE INVENTION

1. Field of the Invention

The present invention relates to data transmission apparatus and data transmission methods, and more particularly to serial data transmission of the computer capable of bus connection or serial connection to external devices.

2. Description of the Related Art

Conventionally, serial data transmission is known as one way to perform communication between DTE (data terminal equipment) and DCE (data circuit terminal equipment). Serial data transmission means transmission in which data is successively transmitted one bit at a time over a single data signal line to carry information from the sender side to the receiver side. Interfaces according to the CCITT (Consultative Committee for International Telephony and Telegraphy) X.21 standard are known as one type of interfaces between devices transmitting data by serial data transmission. In this type of interface, the DTE and the DCE are connected by five signal lines. More specifically, these five signal lines are a transmit data line (T line), a receive data line (R line), a control line (C line), an indication line (I line) and a signal element timing line (S line).

JP S60-12837A discloses a method for transmitting data in which, of the five signal lines connecting the DTE and the DCE, the T line, and the C line are combined to a T' line, moreover the R line, the I line and the S line are combined to an R' line, and data is transmitted with these two lines. With this data transmission method, the DTE and the DCE are provided, respectively, with a multiplexing means and a demultiplexing means, and both the DTE and the DCE are further provided with a means for extracting a synchronization signal from the signals that are multiplexed and demultiplexed by the multiplexing means and the demultiplexing means. Thus, data can be transmitted with fewer signal lines than conventionally.

However, with the above-described data transmission method, a clock signal for synchronizing the sending and receiving of data is transmitted together with the data signal, so that a device for increasing the frequency of the clock by a factor of 10 needs to be provided inside the DCE. Moreover, the above-described data transmission method is premised on bidirectional communication between the DTE and the DCE. Therefore, the data transmission efficiency for unidirectional data transmission from DTE to DCE is poor.

SUMMARY OF THE INVENTION

Addressing the above-noted problems, it is an object of the present invention to provide a data transmission apparatus and a data transmission method enabling high-speed unidirectional data transmission with few signal lines.

According to one aspect of the present invention, a sending circuit includes an encoder for generating a transmission signal by encoding an input signal that is inputted from outside; wherein the transmission signal is outputted to a plurality of signal transmission lines, while switching a value of the transmission signal at every elementary period, which is a preset period; and wherein the encoder encodes the input signal such that a logic level of a signal outputted to at least one of the plurality of signal transmission lines changes when transitioning from a leading elementary period to a trailing elementary period of any two consecutive elementary periods.

With this configuration, when an input signal is inputted into the sending circuit, the transmission signal generated by encoding this input signal is outputted to a plurality of signal transmission lines. At that time, at every preset elementary period, the logic level of the signal outputted to at least one of the plurality of signal transmission lines changes. For this reason, if the receiving side is configured such that the clock signal is generated based on this change of the logic level, then it is not necessary to output a clock signal from the sending circuit. Consequently, the signal line for transmitting the clock signal becomes unnecessary, and high-speed data transmission with fewer signal lines than conventionally becomes possible.

In this sending circuit, it is preferable that the encoder encodes the input signal from a value from which the transmission signal can be obtained to a value excluding a predetermined specific value; and if the value of the transmission signal to be outputted to the signal transmission lines in the leading elementary period of any two consecutive elementary periods is the same as the value of the transmission signal to be outputted to the signal transmission lines in the trailing elementary period, the encoder encodes the input signal to the specific value such that in that trailing elementary period the transmission signal of the specific value is outputted to the signal transmission lines.

With this configuration, if the values of the transmission signal to be outputted to the signal transmission lines in any two consecutive elementary periods becomes the same, then the input signal is encoded to the predetermined specific value in the trailing elementary period. Thus, the value of the transmission signal that is outputted to the signal transmission lines in the leading elementary period will not be the same as the value of the transmission signal that is outputted to the signal transmission lines in the trailing elementary period of any two consecutive elementary periods. For this reason, if the receiving side is configured such that the clock signal is generated based on the change of the logic level of the transmission signal, then it is not necessary to output a clock signal from the sending circuit, and high-speed data transmission with fewer signal lines than conventionally becomes possible.

According to another aspect of the present invention, a receiving circuit for receiving a transmission signal that is transmitted through a plurality of signal transmission lines includes:

a clock generator for generating a clock based on a change of the values of the transmission signal.

With this configuration, the receiving circuit generates a clock signal based on a change of the values of the transmission signal received from the signal transmission lines. For this reason, if the sending side is configured such that the value of the transmission signal changes at every preset elementary period, then it is not necessary to input a clock signal into the receiving circuit. Thus, the signal line for transmitting the clock signal becomes unnecessary, and high-speed data transmission with fewer signal lines than conventionally becomes possible.

In this receiving circuit, it is preferable that, taking a period corresponding to an interval at which the clock is generated as an elementary period, if the value of the transmission signal of a given elementary period is a predetermined specific value, then, for that given elementary period, the decoder decodes the transmission signal of the elementary period directly preceding that elementary period.

With this configuration, when a transmission signal of a predetermined specific value is inputted into the receiving circuit, the transmission signal that was inputted into the receiving circuit in the elementary period directly preceding the elementary period in which this transmission signal was inputted is decoded. Therefore, by transmitting a transmission signal with a specific value in the trailing elementary period of any two consecutive elementary periods, it is possible to express that transmission signals of the same value are transmitted in the leading elementary period and the trailing elementary period of those two elementary periods. Thus, the timing of the transition from the leading elementary period to the trailing elementary period can be detected even in cases in which the value of the transmission signal in the leading elementary period of any two consecutive elementary periods would have been the same as that in the trailing elementary period. Consequently, a clock signal can be generated even when no clock signal is inputted into the receiving circuit, and high-speed data transmission with fewer signal lines than conventionally becomes possible.

According to yet another aspect of the present invention, a data transmission apparatus includes:

a sending circuit including an encoder for generating a transmission signal by encoding an input signal that is inputted from outside, the sending circuit outputting the transmission signal to a plurality of signal transmission lines while switching a value of the transmission signal at every elementary period, which is a preset period; and a receiving circuit for receiving the transmission signal transmitted through the plurality of signal transmission lines;

wherein the encoder encodes the input signal such that a logic level of a signal outputted to at least one of the plurality of signal transmission lines changes when transitioning from a leading elementary period to a trailing elementary period of any two consecutive elementary periods; and wherein the receiving circuit includes a clock generator for generating a clock based on a change of the values of the transmission signal.

With this configuration, when an input signal is inputted into the sending circuit, the transmission signal generated by encoding this input signal is outputted to a plurality of signal transmission lines. At that time, at every preset elementary period, the logic level of the signal outputted to at least one of the plurality of signal transmission lines changes. Also, the receiving circuit generates a clock signal based on a change of the values of the transmission signal received from the signal transmission lines. Therefore, the receiving circuit can generate a clock signal even when no clock signal is transmitted from the sending circuit. Thus, the signal line for transmitting the clock signal becomes unnecessary, and high-speed data transmission with fewer signal lines than conventionally becomes possible.

According to yet another aspect of the present invention, a data transmission method for transmitting data between a sending circuit including an encoder for generating a transmission signal by encoding an input signal that is inputted from outside, the sending circuit outputting the transmission signal to a plurality of signal transmission lines while switching a value of the transmission signal at every elementary period, which is a preset period, and a receiving circuit for receiving the transmission signal transmitted through the plurality of signal transmission lines, includes:

an encoding step of encoding the input signal such that a logic level of a signal outputted to at least one of the plurality of signal transmission lines changes when transitioning from a leading elementary period to a trailing elementary period of any two consecutive elementary periods; and a clock generation step of generating a clock based on a change of the values of the transmission signal.

These and other objects, features and advantages of the present invention will become more apparent from the following detailed description of the present invention when taken in conjunction with the accompanying drawings.

BRIEF DESCRIPTION OF THE DRAWINGS

FIG. 4 shows combinations of logic values of the input signals in this embodiment.

FIG. 5 shows combinations of the logic levels of the A line signal and the logic levels of the B line signal in this embodiment.

FIG. 7 shows an example of the AB transmission states in two consecutive elementary periods.

FIG. 8 shows an example of the correspondence between the values of the input signal and the AB transmission states.

FIG. 9 shows the correspondence between the values of the input signal and the AB transmission states in this embodiment.

FIG. 10A shows a truth table for encoding in accordance with this embodiment.

FIG. 10B shows a truth table for decoding in accordance with this embodiment.

FIG. 11 illustrates the combinations of the AB transmission states in two consecutive elementary periods and the change of the logic level of the A line signal and the B line signal for those combinations of the AB transmission states in this embodiment.

FIGS. 12A to 12I illustrate signal waveforms in the clock decoder of this embodiment.

DESCRIPTION OF THE PREFERRED EMBODIMENTS

The following is a description of embodiments of the present invention, with reference to the accompanying drawings.

1. Configuration of Data Transmission Apparatus

Figure 1:
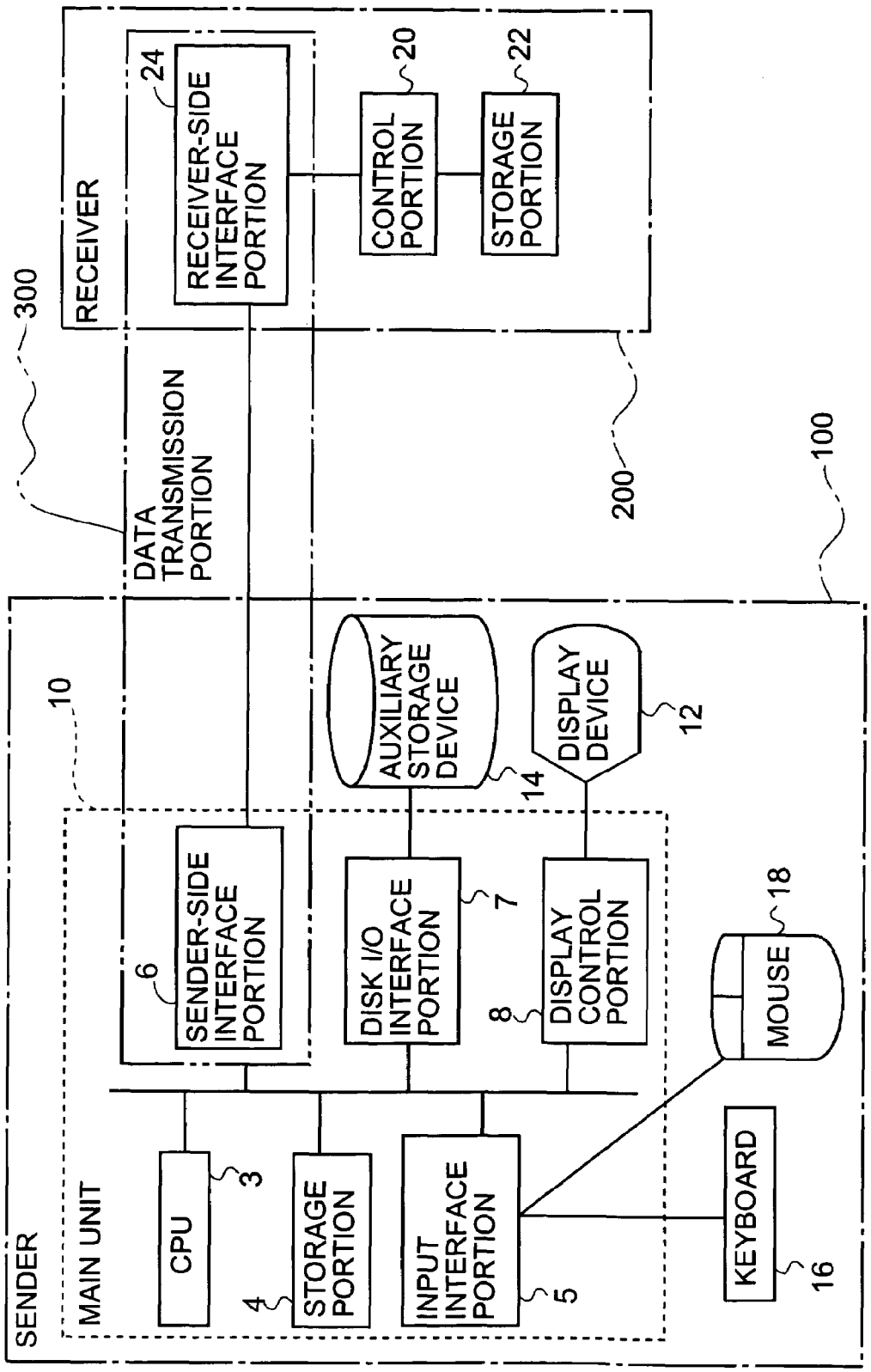
FIG. 1 is a block diagram showing the overall configuration of a data transmission apparatus according to an embodiment of the present invention.

FIG. 1 is a block diagram showing the overall configuration of a data transmission apparatus according to an embodiment of the present invention. This data transmission apparatus includes a sender 100, a receiver 200, and a signal transmission line connecting the sender 100 and the receiver 200. The sender 100 includes a main unit 10, an auxiliary storage device 14, a display device 12, and input devices. The main unit 10 includes a CPU 3, a storage portion 4, an input interface portion 5, a sender-side interface portion (sending circuit) 6, a disk I/O interface portion 7, and a display control portion 8. The auxiliary storage device 14 is connected to the disk I/O interface portion 7. The display device 12 is connected to the display control portion 8. The input devices such as a keyboard 16 and a mouse 18 are connected to the input interface portion 5. The receiver 200 includes a control portion 20, a storage portion 22, and a receiver-side interface portion (receiving circuit) 24. The sender-side interface portion 6 inside the sender 100, the receiver-side interface portion 24 inside the receiver 200 and the signal transmission line connecting the sender 100 and the receiver 200 together constitute a data transmission portion 300.

Figure 2:
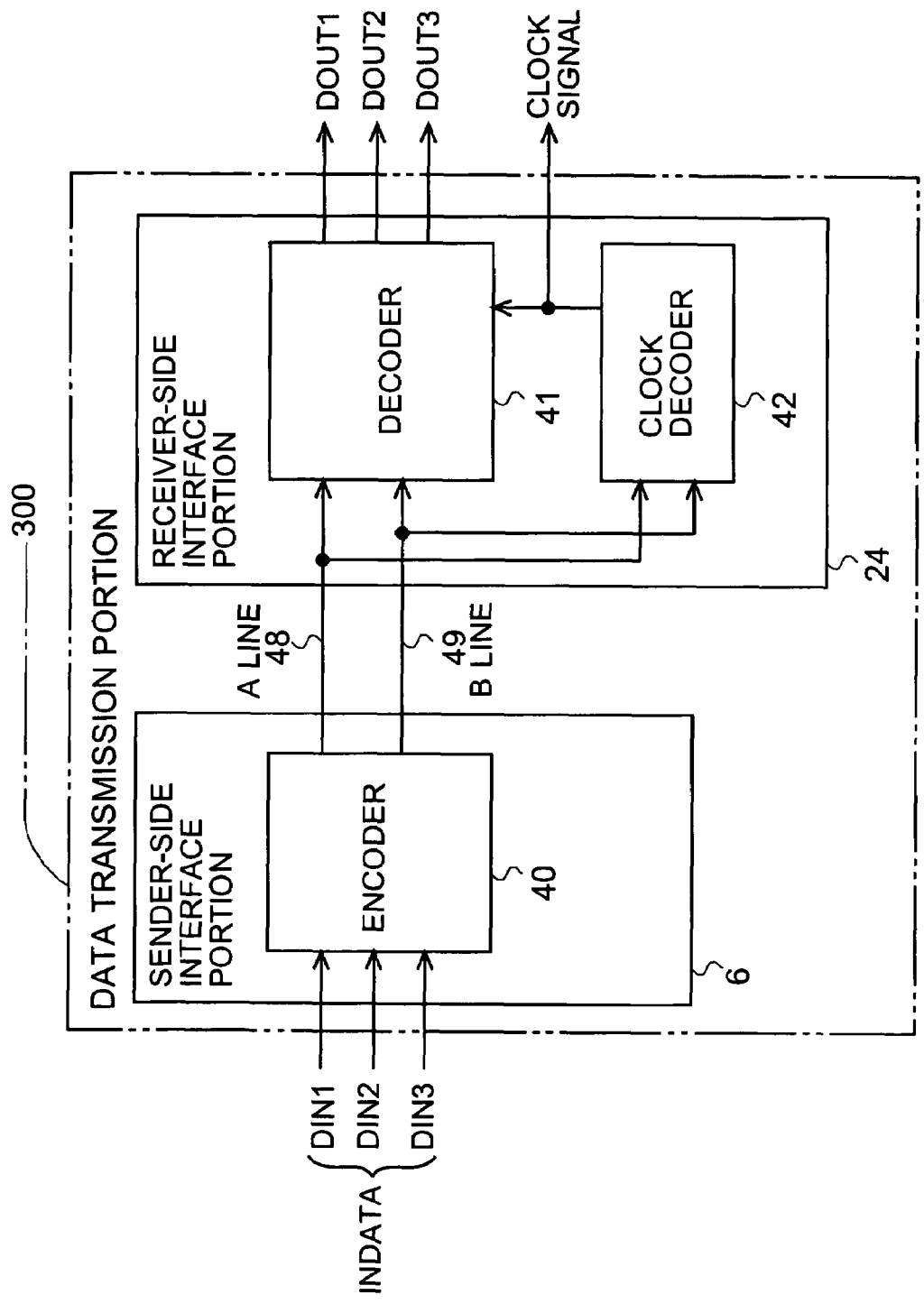
FIG. 2 is a block diagram showing the detailed configuration of the data transmission portion in this embodiment.

FIG. 2 is a block diagram showing the detailed configuration of the data transmission portion 300 of this data transmission apparatus. The sender-side interface portion 6 includes an encoder 40, whereas the receiver-side interface portion 24 includes a decoder 41 and a clock decoder (clock generator) 42. The sender-side interface portion 6 and the receiver-side interface portion 24 are connected by two signal transmission lines. (In the following, for the sake of convenience, one of the two signal transmission lines is referred to as "A line 48" and the other is referred to as "B line 49"). The A line 48 extending from the sender-side interface portion 6 to the receiver-side interface portion 24 branches within the receiver-side interface portion 24, with one branch being connected to the decoder 41 and the other being connected to the clock decoder 42. Similarly, also the B line branches within the receiver-side interface portion 24, with one branch being connected to the decoder 41 and the other being connected to the clock decoder 42. It should be noted that the encoder 40 is a circuit for encoding as described below, and the decoder 41 is a circuit for decoding as described below. There is no particular limitation regarding the specific configuration inside the circuits of the encoder 40 and the decoder 41.

Figure 3:
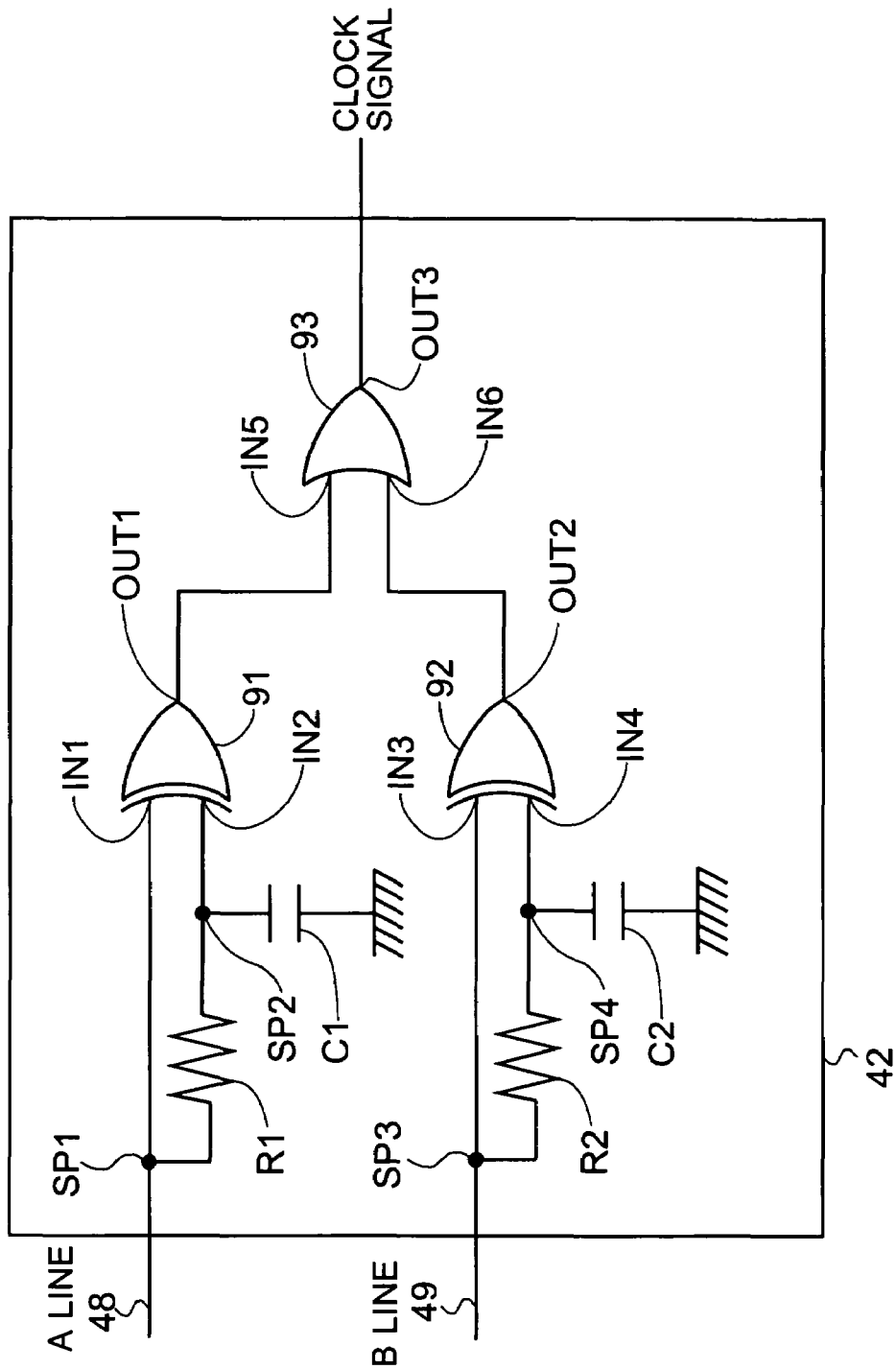
FIG. 3 is a circuit diagram showing the detailed configuration of the clock decoder in this embodiment.

FIG. 3 is a circuit diagram showing the detailed configuration of the clock decoder 42 according to the present embodiment. This clock decoder 42 includes two exclusive-OR circuits (referred to as "EX-OR circuits" in the following) 91 and 92, an OR circuit 93, two capacitors C1 and C2, and two resistors R1 and R2. The A line 48, which extends from the outside to the inside of the clock decoder 42 branches at a branching point SP1 inside the clock decoder 42, with one branch being connected to an input terminal IN1 of the EX-OR circuit 91, and the other branch being connected to an input terminal IN2 of the EX-OR circuit 91. Between the branching point SP1 and the input terminal IN2, the A line 48 branches again at a branching point SP2. Moreover, one side of the resistor R1 is connected to the branching point SP1, and the other side of the resistor R1 is connected to the input terminal IN2 of the EX-OR circuit 91, and connected to ground via the capacitor C1.

The B line 49, which extends from the outside to the inside of the clock decoder 42, branches at a branching point SP3 inside the clock decoder 42, with one branch being connected to an input terminal IN3 of the EX-OR circuit 92, and the other branch being connected to an input terminal IN4 of the EX-OR circuit 92. Between the branching point SP3 and the input terminal IN4, the B line 49 branches again at a branching point SP4. Moreover, one side of the resistor R2 is connected to the branching point SP3, and the other side of the resistor R2 is connected to the input terminal IN4 of the EX-OR circuit 92, and connected to ground via the capacitor C2.

An output terminal OUT1 of the EX-OR circuit 91 is connected to an input terminal IN5 of the OR circuit 93, and an output terminal OUT2 of the EX-OR circuit 92 is connected to an input terminal IN6 of the OR circuit 93. Moreover, the signal line extending from the output terminal OUT3 of the OR circuit 93 extends to the outside of the clock decoder 42.

2. Operation of the Sender-Side Interface

The following is an explanation of the operation of the sender-side interface portion 6 in this data transmission apparatus. As shown in FIG. 2, an input signal INDATA is inputted into the encoder 40. The input signal INDATA is composed of three signals DIN1, DIN2 and DIN3. One bit of information is carried by each of these signals DIN1, DIN2 and DIN3. That is to say, the input signal INDATA carries three bits of information. With this input signal INDATA, an 18-bit RGB signal having six bits each for the colors red, green and blue may be a transmitted by time division of three bits each. The data such as those three bits of data that is received by the encoder 40 at one time through input of the input signal INDATA is referred to as "the data for one unit."

FIG. 4 shows combinations of logic values for the input signals DIN1, DIN2 and DIN3. As shown in FIG. 4, there are eight combinations of the logic values for the input signals DIN1, DIN2 and DIN3. It should be noted that in these explanations, a high logic level of the signal corresponds to "1" and a low logic level of the signal corresponds to "0".

FIG. 5 shows combinations of the logic levels of the signal supplied to the A line 48 (referred to as "A line signal" below) and the signal supplied to the B line 49 (referred to as "B line signal" below). As shown in FIG. 5, there are four combinations of logic levels of the A line signal and the logic levels of the B line signal. It should be noted that, for the sake of convenience, states represented by a combination of the logic level of the A line signal and the logic level of the B line signal are referred to as "AB transmission states". As shown in FIG. 5, there are four AB transmission states, and for the sake of convenience, the symbols "X", "Y", "Z" and "S" are assigned to these AB transmission states. For example, when the A line signal is at high level (referred "H level" below) and the B line signal is at low level (referred to as "L level" below), then the "AB transmission state" is "Z". It should be noted that the A line signal and the B line signal are outputted from the encoder 40 in such a manner that the AB transmission state is switched every elementary period, which is a period that has been set in advance.

Figure 6:
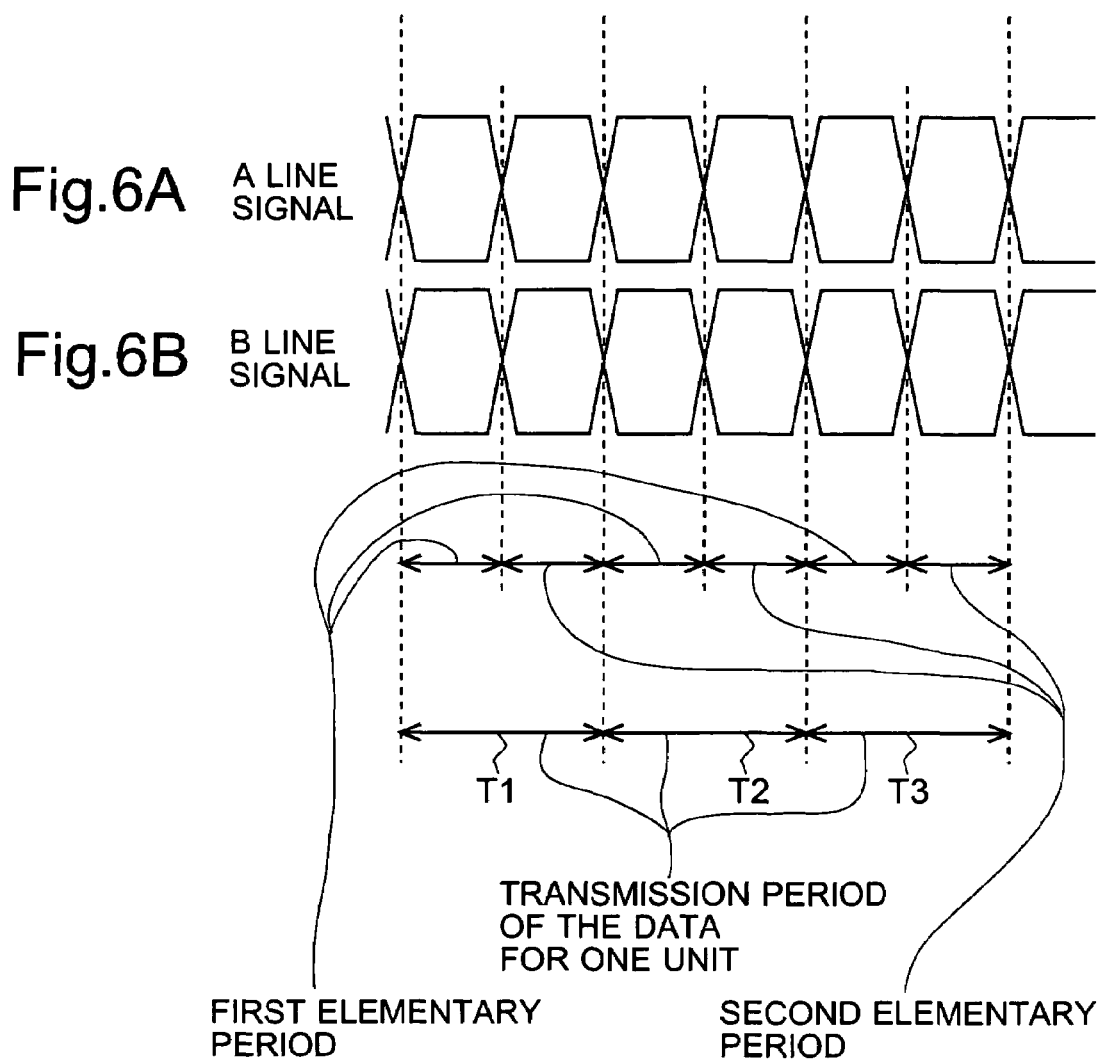
FIG. 6A is a waveform diagram of the A line signal in this embodiment.
FIG. 6B is a waveform diagram of the B line signal in this embodiment.

As described above, there are eight combinations for the DIN1, DIN2 and DIN3 constituting the input signal INDATA. On the other hand, there are four combinations for the AB transmission state. Therefore, the information representing the input signal INDATA (data for one unit) cannot be transmitted from the encoder 40 to the decoder 41 in one elementary period. Accordingly, in the present embodiment, the values of the input signal INDATA are associated with the AB transmission states of two elementary periods. Thus, the information representing the input signal INDATA (data for one unit) can be transmitted from the encoder 40 to the decoder 41 in two elementary periods. It should be noted that of these two consecutive elementary periods, the temporally first one is referred to as "first elementary period" and the elementary period following the "first elementary period" is referred to as "second elementary period". FIG. 6A is a waveform diagram of the A line signal, and FIG. 6B is a waveform diagram of the B line signal. As shown in FIG. 6A and FIG. 6B, at every two elementary periods (i.e. at every combination of first elementary period and second elementary period), the data for one unit is sequentially transmitted from the encoder 40 to the decoder 41.

As shown in FIG. 5, the AB transmission state occurring in a given elementary period is one of the states X, Y, Z and S. Let us assume that in a given elementary period, an AB transmission state of X, Y or Z, but not S (predetermined value) is assumed. In this case, as shown in FIG. 7, there are nine combinations of the AB transmission states in the first elementary period and the second elementary period that can occur in two consecutive elementary periods. Moreover, as shown in FIG. 4, eight different input signals INDATA can be inputted into the encoder 40. Therefore, as shown in FIG. 8, it is possible to associate the values of the input signal INDATA with the AB transmission states in two elementary periods. For example, the value "011" of the input signal INDATA is associated with the AB transmission state which becomes Y in the first elementary period and becomes X in the second elementary period.

In the present embodiment, no clock signal is transmitted between the sender-side interface 6 and the receiver-side interface 24, and the clock signal is generated by the receiver-side interface portion 24 based on the A line signal and the B line signal, as explained below. When the values of the input signal INDATA and the AB transmission states are associated with each other in the manner shown in FIG. 8, then the AB transmission state in the first elementary period may be the same as the AB transmission state in the second elementary period (for example, when the value of the input signal INDATA is "000"). In this case, the receiver-side interface portion 24 cannot detect the timing of the transition from the first elementary period to the second elementary period, and the clock signal cannot be generated. In order to address this problem, in the present embodiment, the values of the input signal INDATA and the AB transmission states are associated as shown in FIG. 9 in such a manner that when an input signal INDATA is inputted into the encoder 40 in which the AB transmission state in the first elementary period and the AB transmission state in the second elementary period are the same, then the AB transmission state becomes S in the second elementary period. That is to say, the encoder 40 encodes the data in accordance with the truth table shown in FIG. 10A. As a result, the AB transmission state in the first elementary period and the AB transmission state in the second elementary period will always be different, and the timing of the transition from the first elementary period to the second elementary period can be detected by the receiver-side interface portion 24. Thus, the clock signal is generated by the receiver-side interface portion 24. Therefore, there is no need to transmit a clock signal from the sender-side interface portion 6 to the receiver-side interface portion 24.

Here, whereas there are nine combinations of the AB transmission state in the first elementary period and the AB transmission state in the second elementary period, there are only eight different values of the input signal INDATA, so that there is a combination of AB transmission states that is not associated with a value of the input signal INDATA, a combination of "Z" in the first elementary period and "S" in the second elementary period. This combination of AB transmission states can be used as a control signal for a control inside the data transmission portion 300. This corresponds to the row in FIG. 9 in which INDATA is "Flag", to the row in FIG. 10A in which the input is "Flag", and to the row in FIG. 10B in which the output is "Flag".

Referring to FIGS. 6A, 6B and 9, the following is an explanation of the change of the AB transmission state when making a transition from the transmission period of the data for a given unit to the transmission period of the data for the next unit. When the values of the input signal INDATA are associated with the AB transmission states as shown in FIG. 9, then it may occur that the AB transmission state of the second elementary period of the period denoted by the symbol T1 in FIGS. 6A and 6B becomes the same as the AB transmission state of the first elementary period of the period denoted by the symbol T2. For example, let us assume that an input signal INDATA of the value "011" is inputted in the period marked T1 and an input signal INDATA of the value "000" is inputted in the period marked T2. In this case, the AB transmission state of the second elementary period in T1 is X and the AB transmission state of the first elementary period in T2 is also X. In this case, the receiver-side interface portion 24 cannot detect the timing of the transition from the period T1 to the period T2, and it is not possible to generate a clock signal. Accordingly, if the AB transmission state of the first elementary period in the data transmission period of the data for a given unit is the same AB transmission state of the second elementary period in the data transmission period of the data for the previous unit, the AB transmission state of the first elementary period in the data transmission period of the data for that given unit is set to "S". As a result, in the example above, the AB transmission state of the second elementary period in T1 becomes X, and the AB transmission state of the first elementary period in T2 becomes S, so that the receiver-side interface portion 24 can detect the timing of the transition from the period T1 to the period T2. Thus, a clock signal can be generated by the receiver-side interface portion 24.

FIG. 11 illustrates the combinations of the AB transmission states in two consecutive elementary periods and the change of the logic level of the A line signal and the B line signal for those combinations of the AB transmission states. With above mentioned configuration, the combinations of AB transmission states in any two consecutive elementary periods becomes as shown in FIG. 11. "Leading elementary period" means the temporally leading period of the two consecutive elementary periods, and "tailing elementary period" means the temporally trailing period of the two consecutive elementary periods. As shown in FIG. 11, there are twelve combinations of AB transmission states in the two consecutive elementary periods. For example, when the AB transmission state of the leading elementary period is "X" and the AB transmission state of the trailing elementary period is "Y", then the logic level of the "B line signal" changes at the time of the transition from the leading elementary period to the trailing elementary period. Thus, for any of the twelve combinations of AB transmission states, the logic level of at least one of the A line signal and the B line signal changes at the time of transition from the leading elementary period to the trailing elementary period.

3. Operation of the Receiver-Side Interface

The following is an explanation of the operation of the receiver-side interface portion 24 in this data transmission device. As shown in FIG. 2, the decoder 41 receives the A line signal and the B line signal outputted from the encoder 40, and the clock signal outputted from the clock decoder 42. The clock decoder 42 receives the A line signal and the B line signal. The decoder 41 reads in the value of the A line signal and the value of the B line signal in synchronization with the clock signal, and decodes the data in accordance with the truth table shown in FIG. 10B. At that time, if the AB transmission state represented by the value of the A line signal and the value of the B line signal is S, then the decoding is performed taking the A line signal and the B line signal of the immediately preceding elementary period as the received A line signal and B line signal. As a result of the decoding, the output signals DOUT1, DOUT2 and DOUT 3 are outputted from the decoder 41. It should be noted that in the case of the state shown at the lowest row in the truth table (the row in which the output is "Flag"), processing may be performed as if the receiver-side interface portion 24 had received a control signal, for example.

Referring to FIG. 3, the following is an explanation of the operation of the clock decoder 42. In the clock decoder 42, the A line signal is transmitted to the input terminal IN1 and the input terminal IN2 of the EX-OR circuit 91. Here, for the sake of convenience, the A line signal that is inputted into the input terminal IN1 is referred to as "A1 line signal" and the A line signal that is inputted into the input terminal IN2 is referred to as "A2 line signal". The resistor R1 provided between the branching point SP1 and the input terminal IN2 and the capacitor C1 delay the A2 line signal with respect to the A1 line signal. This is the same for the B line signal.

FIGS. 12A to 12I illustrate signal waveforms in this clock decoder 42 for the case that an input signal INDATA of the value "010" is inputted in the transmission period of the data for a given unit and an input signal INDATA of the value "111" is inputted in the transmission period of the data for the next unit. FIG. 12A shows the signal waveform at the branching point marked by the reference symbol SP1 in FIG. 3. FIG. 12B shows the signal waveform at the input terminal IN1. FIG. 12C shows the signal waveform at the input terminal IN2. FIG. 12D shows the signal waveform at the input terminal IN5. FIG. 12E shows the signal waveform at the branching point marked by the reference symbol SP3 in FIG. 3. FIG. 12F shows the signal waveform at the input terminal IN3. FIG. 12G shows the signal waveform at the input terminal IN4. FIG. 12H shows the signal waveform at the input terminal IN6. FIG. 12I shows the signal waveform at the output terminal OUT3. Symbol t1 through t5 indicate the timings at which the decoder 41 receives the A line signal and the B line signal that are outputted from the encoder 40.

Since the A2 line signal is delayed with respect to the A1 line signal as noted above, the change of the signal level at the input terminal IN2 is delayed with respect to the change of the signal level at the input terminal IN1, as shown in FIG. 12B and FIG. 12C. As a result, when there is a change in the logic level of the A line signal, there is a period in which the logic level of the A1 line signal at the input terminal IN1 differs from the logic level of the A2 line signal at the input terminal IN2 and the signal outputted from the EX-OR circuit 91 during that period becomes H level. Similarly, when there is a change in the logic level of the B line signal, the signal that is outputted from the EX-OR circuit 92 becomes H level. Moreover, the output terminal OUT1 of the EX-OR circuit 91 and the output terminal OUT2 of the EX-OR circuit 92 are respectively connected to the input terminals IN5 and IN6 of the OR circuit 93, so that when the signal that is outputted from the EX-OR circuit 91 is at H level or the signal that is outputted from the EX-OR circuit 92 is at H level, the signal that is outputted from the OR circuit 93 (output terminal OUT3) becomes H level.

For example, when an input signal INDATA with the value "010" is inputted, as shown in FIG. 12, then the AB transmission state of the leading elementary period becomes X. That is to say, in the period from t1 to t2, the logic level of the A line signal at the branching point SP1 and the logic level of the B line signal at the branching point SP3 are low. At t2, the AB transmission state becomes Z. That is to say, the logic level of the A line signal at the branching point SP1 becomes high whereas the logic level of the B line signal at the branching point SP3 stays low. In this case, both the signal that is inputted into the input terminal IN1 and the signal that is inputted into the input terminal IN2 change from L level to H level, but the waveform of the signal that is inputted into the input terminal IN1 is rectangular, whereas the waveform of the signal that is inputted into the input terminal IN2 has an asymptotic shape. For this reason, there is a period in which the logic level of the signal that is inputted into the input terminal IN1 is different from the logic level of the signal that is inputted into the input terminal IN2, and in this period, the signal that is inputted into the input terminal IN5 becomes H level. Then, during the period in which the signal inputted into the input terminal IN5 is H level, also the signal that is outputted from the output terminal OUT3 becomes H level.

At t3, an input signal INDATA of the value "111" is inputted, and the AB transmission state becomes S. That is to say, while the logic level of the A line signal at the branching point SP1 stays high, the logic level of the B line signal at the branching point SP3 becomes high. In this case, the logic level of the signal inputted into the input terminal IN1 and the logic level of the signal inputted into the input terminal IN2 do not change, so that the signal that is inputted into the input terminal IN5 stays low. On the other hand, both the signal that is inputted into the input terminal IN3 and the signal that is inputted into the input terminal IN4 change from L level to H level, but as shown in FIG. 12, there is a period in which the logic level of the signal inputted into the input terminal IN3 is different from the logic level of the signal inputted into the input terminal IN4, so that the signal inputted into the input terminal IN6 during this period becomes H level. Then, during the period in which the signal that is inputted into the input terminal IN6 is H level, also the signal that is outputted from the output terminal OUT3 becomes H level. Moreover, also at t4 and after, a similar operation as above is performed. Thus, the signal that is outputted from the output terminal OUT3 becomes H level at every elementary period, and the period corresponding to this elementary period becomes the pulse generation interval of the clock signal inputted into the decoder 41.

The foregoing was an explanation for the case that an input signal INDATA with the value "010" is inputted in the transmission period of the data for a given unit and an input signal INDATA with the value "111" is inputted in the transmission period of the data for the next unit, but a similar operation is also performed in the case that other input signals INDATA are inputted.

As shown in FIG. 11, there are twelve combinations of AB transmission states in two consecutive elementary periods, and for each single one of those combinations, the logic level of at least one of the A line signal and the B line signal changes at the transition from the leading elementary period to the trailing elementary period. Thus, since the logic level of at least one of the A line signal and the B line signal changes, there is a period in which at least one of the signals outputted from the EX-OR circuit 91 and the EX-OR circuit 92 becomes H level at a time interval corresponding to the elementary period. As a result, at constant time intervals, there is a period at which the signal that is outputted from the OR circuit 93 becomes H level. Thus, the clock signal is generated.

4. Advantageous Effect

As described above, with the present embodiment, two signal transmission lines 48 and 49 are provided between the sender-side interface portion 6 and the receiver-side interface portion 24, and information is transmitted bitwise by each of the signal transmission lines. Then, data is transmitted from the sender-side interface portion 6 to the receiver-side interface portion 24 in such a manner that the logic level of the transmission signal supplied to at least one of the signal transmission lines changes at every elementary period. Thus, at the receiver-side interface portion 24, the logic level of the transmission signal supplied from at least one of the signal transmission lines changes at constant time intervals, and a clock signal is generated based on this change of the logic level of the transmission signal. Therefore, there is no necessity to transmit a clock signal between the sender-side interface portion 6 and the receiver-side interface portion 24.

In conventional data transmission apparatus in which a clock signal is sent from the sending side interface portion 6 to the receiving side interface portion 24, the logic level of the transmission signal (data signal) supplied on the data signal line changes either at the timing when the clock signal rises or at the timing when the clock signal falls. That is to say, while the logic level of the transmission signal supplied on the data signal line changes once, the logic level of the clock signal changes twice. Therefore, conventionally, the transmission speed of the data signal was only half the transmission speed of the clock signal. In the present embodiment, as described above, sending a clock signal is unnecessary, so that data signals can be transmitted at the transmission speed of the clock signal in the conventional data transmission apparatus. That is to say, the transmission speed of the data signals becomes twice that of the prior art.

Thus, without increasing the clock frequency in the data transmission apparatus, a high-speed data transmission between the sender 100 and the receiver 200 can be realized with fewer signal lines than conventionally. Thus, by reducing the number of signal lines, the influence of the electromagnetic waves generated by the transfer network can be reduced, the circuit board can be made smaller and the material costs can be reduced.

5. Further Remarks

The above-described embodiment has a configuration in which the data transmission period for one unit is two elementary periods, but the present invention is not limited to this, and it is also possible that the data transmission period for one unit is three or more elementary periods. Also, in the present embodiment, the sender and the receiver are connected by two signal transmission lines, but the present invention is not limited to this, and they can also be connected by three or more signal transmission lines. Furthermore, in the present embodiment, the signal is delayed by a configuration including a capacitor and a resistor inside the clock decoder, but the present invention is not limited to this, and any configuration suitable for delaying signals may be employed.

While the invention has been described in detail, the foregoing description is in all aspects illustrative and not restrictive. It is understood that numerous other modifications and variations can be devised without departing from the scope of the invention.

What is claimed is:

1. A sending circuit comprising:

an encoder for generating a transmission signal by encoding an input signal that is inputted from outside;

wherein the transmission signal is outputted to a plurality of signal transmission lines, while switching a value of the transmission signal at every elementary period, which is a preset period;

wherein the encoder encodes the input signal such that a logic level of a signal outputted to at least one of the plurality of signal transmission lines changes when transitioning from a leading elementary period to a trailing elementary period of any two consecutive elementary periods;

wherein the encoder encodes the input signal from a value from which the transmission signal can be obtained to a value excluding a predetermined specific value; and wherein if the value of the transmission signal to be outputted to the signal transmission lines in the leading elementary period of any two consecutive elementary periods is the same as the value of the transmission signal to be outputted to the signal transmission lines in the trailing elementary period, the encoder encodes the input signal to the specific value such that in that trailing elementary period the transmission signal of the specific value is outputted to the signal transmission lines.

2. The sending circuit according to claim 1, wherein the encoder encodes the input signal such that the value of the input signal corresponds to the values of the transmission signal of two consecutive elementary periods.

3. The sending circuit according to claim 1, wherein the transmission signal is outputted to two signal transmission lines.

4. A data transmission apparatus comprising:

a sending circuit comprising an encoder for generating a transmission signal by encoding an input signal that is inputted from outside, the sending circuit outputting the transmission signal to a plurality of signal transmission lines while switching a value of the transmission signal at every elementary period, which is a preset period; and a receiving circuit for receiving the transmission signal transmitted through the plurality of signal transmission lines;

wherein the encoder encodes the input signal such that a logic level of a signal outputted to at least one of the plurality of signal transmission lines changes when transitioning from a leading elementary period to a trailing elementary period of any two consecutive elementary periods;

wherein the receiving circuit comprises a clock generator for generating a clock based on a change of the values of the transmission signal;

wherein the encoder encodes the input signal from a value from which the transmission signal can be obtained to a value excluding a predetermined specific value; and wherein if the value of the transmission signal to be outputted to the signal transmission lines in the leading elementary period of any two consecutive elementary periods is the same as the value of the transmission signal to be outputted to the signal transmission lines in the trailing elementary period, the encoder encodes the input signal to the specific value such that in that trailing elementary period the transmission signal of the specific value is outputted to the signal transmission lines.

5. The data transmission apparatus according to claim 4, wherein the receiving circuit further comprises a decoder for decoding the transmission signals based on the clock.

6. The data transmission apparatus according to claim 5, wherein if the value of the transmission signal of a given elementary period is a predetermined specific value, then, for that given elementary period, the decoder decodes the transmission signal of the elementary period directly preceding that elementary period.

* * * * *